United States Patent
Bistriceanu et al.

(10) Patent No.: US 8,050,967 B2
(45) Date of Patent: *Nov. 1, 2011

(54) SYSTEM AND METHOD FOR TRACKING USER ACTIVITY IN AN INCENTIVE AWARD SYSTEM

(75) Inventors: Virgil Bistriceanu, Chicago, IL (US); Craig Muller, Rolling Meadows, IL (US)

(73) Assignee: Mypoints.com Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/108,146

(22) Filed: Apr. 23, 2008

(65) Prior Publication Data

US 2008/0201231 A1    Aug. 21, 2008

Related U.S. Application Data

(63) Continuation of application No. 11/770,994, filed on Jun. 29, 2007, which is a continuation of application No. 09/080,946, filed on May 19, 1998, now Pat. No. 7,240,022.

(51) Int. Cl.
*G06Q 30/00* (2006.01)
(52) U.S. Cl. ............... 705/14.19; 705/14.27; 705/14.39
(58) Field of Classification Search ............ 705/14, 705/10, 14.1, 14.27, 14.36, 14.39, 14.19
See application file for complete search history.

(56) References Cited

U.S. PATENT DOCUMENTS

| | | | |
|---|---|---|---|
| 3,639,686 A | 2/1972 | Walker et al. | |
| 3,769,579 A | 10/1973 | Harney | |
| 4,331,973 A | 5/1982 | Eskin et al. | |
| 4,546,382 A | 10/1985 | McKenna et al. | |
| 4,602,279 A | 7/1986 | Freeman | |
| 4,630,108 A | 12/1986 | Gomersall | |
| 4,646,145 A | 2/1987 | Percy et al. | |
| 4,658,290 A | 4/1987 | McKenna et al. | |

(Continued)

FOREIGN PATENT DOCUMENTS

EP    0 265 232    4/1988

(Continued)

OTHER PUBLICATIONS

"All About Earning with MyPoints," (2000) Retrieved from the Internet on Feb. 16, 2000: URL <http://www.mypoints.com/mp/dStatial.show?isref=main.sampleWeb.EarningOpps.default>.

(Continued)

*Primary Examiner* — Susanna M Meinecke Diaz
(74) *Attorney, Agent, or Firm* — Marshall, Gerstein & Borun LLP

(57) ABSTRACT

A method of efficiently detecting a visit to a web site participating in an incentive award program, wherein the visit is detected at an information gathering system and wherein the information gathering system provides the incentive award program, the method including receiving a request message from a user including an award identifier, wherein the award identifier is associated with a predefined user activity and wherein the user sends the request message by activating a hyperlink presented on the participating web site during the visit; identifying a desired destination based on the request message received from the user, wherein the hyperlink advertises the desired destination to the user and wherein the desired destination is distinct from an address of the information gathering system at which the request message is received; and sending a redirect message to the user, wherein the redirect message includes an Internet address of the desired destination.

20 Claims, 7 Drawing Sheets

U.S. PATENT DOCUMENTS

| | | | |
|---|---|---|---|
| 4,745,468 A | 5/1988 | Von Kohorn | |
| 4,791,281 A | 12/1988 | Johnsen et al. | |
| 4,799,156 A | 1/1989 | Shavit et al. | |
| 4,805,020 A | 2/1989 | Greenberg | |
| 4,850,007 A | 7/1989 | Marino et al. | |
| 4,872,113 A | 10/1989 | Dinerstein | |
| 4,876,592 A | 10/1989 | Von Kohorn | |
| 4,882,675 A | 11/1989 | Nichtberger et al. | |
| 4,926,255 A | 5/1990 | Von Kohorn | |
| 4,941,090 A | 7/1990 | McCarthy | |
| 4,967,273 A | 10/1990 | Greenberg | |
| 4,970,681 A | 11/1990 | Bennett et al. | |
| 4,972,504 A | 11/1990 | Daniel, Jr. et al. | |
| 4,982,346 A | 1/1991 | Girouard et al. | |
| 4,992,940 A | 2/1991 | Dworkin | |
| 5,025,372 A | 6/1991 | Burton et al. | |
| 5,034,807 A | 7/1991 | Von Kohorn | |
| 5,056,019 A | 10/1991 | Schultz et al. | |
| 5,057,915 A | 10/1991 | Von Kohorn | |
| 5,114,128 A | 5/1992 | Harris, Jr et al. | |
| 5,117,355 A | 5/1992 | McCarthy | |
| 5,128,752 A | 7/1992 | Von Kohorn | |
| 5,155,591 A | 10/1992 | Wachob | |
| 5,191,410 A | 3/1993 | McCalley et al. | |
| 5,201,010 A | 4/1993 | Deaton et al. | |
| 5,202,826 A | 4/1993 | McCarthy | |
| 5,220,501 A | 6/1993 | Lawlor et al. | |
| 5,227,874 A | 7/1993 | Von Kohorn | |
| 5,283,731 A | 2/1994 | Lalonde et al. | |
| 5,283,734 A | 2/1994 | Von Kohorn | |
| 5,287,181 A | 2/1994 | Holman | |
| 5,287,268 A | 2/1994 | McCarthy | |
| 5,305,195 A | 4/1994 | Murphy | |
| 5,347,632 A | 9/1994 | Filepp et al. | |
| 5,369,571 A | 11/1994 | Metts | |
| RE34,915 E | 4/1995 | Nichtberger et al. | |
| 5,410,598 A | 4/1995 | Shear | |
| 5,438,355 A | 8/1995 | Palmer | |
| 5,438,356 A | 8/1995 | Ushiki et al. | |
| 5,446,919 A | 8/1995 | Wilkins | |
| 5,467,269 A | 11/1995 | Flaten | |
| 5,483,444 A | 1/1996 | Heintzeman et al. | |
| 5,500,681 A | 3/1996 | Jones | |
| 5,502,636 A | 3/1996 | Clarke | |
| 5,515,098 A | 5/1996 | Carles | |
| 5,537,314 A | 7/1996 | Kanter | |
| 5,557,721 A | 9/1996 | Fite et al. | |
| 5,621,812 A | 4/1997 | Deaton et al. | |
| 5,664,115 A | 9/1997 | Fraser | |
| 5,675,510 A | 10/1997 | Coffey et al. | |
| 5,708,780 A | 1/1998 | Levergood et al. | |
| 5,710,884 A | 1/1998 | Dedrick | |
| 5,712,979 A | 1/1998 | Graber et al. | |
| 5,717,860 A | 2/1998 | Graber et al. | |
| 5,717,923 A | 2/1998 | Dedrick | |
| 5,734,838 A | 3/1998 | Robinson et al. | |
| 5,740,252 A | 4/1998 | Minor et al. | |
| 5,751,956 A | 5/1998 | Kirsch | |
| 5,751,961 A | 5/1998 | Smyk | |
| 5,774,870 A | 6/1998 | Storey | |
| 5,794,210 A | 8/1998 | Goldhaber et al. | |
| 5,812,769 A | 9/1998 | Graber et al. | |
| 5,835,087 A | 11/1998 | Herz et al. | |
| 5,848,396 A | 12/1998 | Gerace | |
| 5,855,008 A | 12/1998 | Goldhaber et al. | |
| 5,915,243 A | 6/1999 | Smolen | |
| 5,923,016 A | 7/1999 | Fredregill et al. | |
| 5,931,907 A | 8/1999 | Davies et al. | |
| 5,937,391 A | 8/1999 | Ikeda et al. | |
| 5,960,409 A * | 9/1999 | Wexler | 705/14.41 |
| 5,974,398 A | 10/1999 | Hanson et al. | |
| 5,991,735 A | 11/1999 | Gerace | |
| 5,991,736 A | 11/1999 | Ferguson et al. | |
| 5,999,914 A | 12/1999 | Blinn et al. | |
| 6,016,504 A | 1/2000 | Arnold et al. | |
| 6,029,141 A | 2/2000 | Bezos et al. | |
| 6,049,785 A | 4/2000 | Gifford | |
| 6,138,142 A | 10/2000 | Linsk | |
| 6,178,407 B1 * | 1/2001 | Lotvin et al. | 705/14.73 |
| 6,286,005 B1 | 9/2001 | Cannon | |
| 6,915,271 B1 * | 7/2005 | Meyer et al. | 705/14.35 |
| 7,240,022 B1 * | 7/2007 | Bistriceanu et al. | 705/14 |
| 2003/0139969 A1 * | 7/2003 | Scroggie et al. | 705/26 |

FOREIGN PATENT DOCUMENTS

| | | |
|---|---|---|
| EP | 0 308 224 | 3/1989 |
| GB | 1 565 286 | 4/1980 |
| JP | 53-13830 | 2/1978 |
| JP | 63-37726 | 2/1988 |
| JP | 63-37727 | 2/1988 |
| JP | 5-217073 | 8/1993 |
| JP | 5-298337 | 11/1993 |
| JP | 6-004771 | 1/1994 |
| JP | 6-276376 | 9/1994 |
| JP | 7-230494 | 8/1995 |
| WO | WO-93/12489 | 6/1993 |
| WO | WO-95/16971 | 6/1995 |
| WO | WO-96/39668 | 12/1996 |
| WO | WO-97/22058 | 6/1997 |
| WO | WO-97/22074 | 6/1997 |
| WO | WO-97/23838 | 7/1997 |
| WO | WO-98/05011 | 2/1998 |
| WO | WO-98/31155 | 7/1998 |

OTHER PUBLICATIONS

"Business is Blooming, Thanks," *Business Week*, pp. 164 (1995).
"Direct Marketing Solutions to Increase Your ROI," (2000) Retrieved from the Internet on Feb. 16, 2000: URL <http://www.mypointsinc.com/content/body/b11423.htm>.
"Green Stamps Go Cyber," Promo, pp. 13 (1997).
"Green Stamps Hit the Web in E-Mail Incentive Programs," *Advertising Age*, pp. s24 (1997).
"In Brieft: Web Revenues Up Ahead: Less Hat, More Cattle," *Media Daily*, 4(5) (1997).
"Incentives Spur Productivity Better Than Warning Workers," *O'Dwyer's PR Services Report*, pp. 41 (1995).
"Intellpost Launches Bonusmail with 50,000 Members," (1997) Retrieved from Internet on Jul. 23, 1999: URL <http://www.mypointsinc.com/content/body/release/press001.htm>.
"Let the Internet Reward You: Join MyPoints Today," (1999) Retrieved from the Internet on Jul. 23, 1999: URL <http://www.mypoints.com>.
"Media Matrix—Audience Measurement Services Article," (1998) Retrieved from the Internet on Mar. 4, 1998: URL <http://www.mediametrix.com/interact-mmaudimeas.htm>.
"Media Matrix—Frequently Asked Questions Article," (1998) Retrieved from the Internet on Mar. 4, 1998: URL <http://www.mediametrix.com.interact-mmfaq.htm>.
"MotivationNet Benefits from Flexibility of Open Market's Award-Winning Internet Commerce Software," *PR Newswire*, pp. 0902NEMTU01 (1997).
"MyPoints: Help Useful Information," (2000) Retrieved from the Internet on Feb. 16, 2000: URL <http://www.mypoints.com/mp/dStatial.show?isref=main.nonmemberhelp.default>.
"MyPoints Member Guide," (2000) Retrieved from the Internet on Feb. 16, 2000: URL<http://www.mypoints.com/mp/dStatial.show?isref=main.nonmemberguide.default>.
"MyPoints Privacy Promise," (2000) Retrieved from the Internet on Feb. 16, 2000: URL <http://www.mypoints.com/mp/dStatial.show?isref=main.privacyPolicy.default>.
"MyPoints.com Online Media Kit," (2000). Retrieved from the Internet on Feb. 16, 2000: URL <http://www.mypointsinc.com/content/body/b11120.htm>.
"MyPoints.com Unveils Integrated Approach to Internet Direct Marketing," (1999) Retrieved from the Internet: URL <http://www.mypointsinc.com/content/body/release/press024.htm>.
"NAPA Advantage' Dealer Incentive.National Automotive Parts Association's Customer-Incentive Membership Program," *Automotive Marketing*, 25(1):22 (1996).
"Net Gains," *Marketing Week*, pp. 33 (1995).
"Net Perceptions Takes on Firefly with Profiling System," *Advertising Age*, 68(29):27 (1997).

"Open Market and Pilot Partner for Secure Electronic Commerce," *PR Newswire*, pp. 1104SFTU026 (1997).
"Our People Management" (2000) Retrieved from the Internet on Feb. 16, 2000: URL <http://www.mypointsinc.com/content/body/b24310.htm>.
"Primedia Ventures Invests in Intellipost," (1999) Retrieved from the Internet on Jul. 23, 1999: URL <http://www.mypointsinc.com/content/body/releases/press017.htm>.
"Web Becomes a Viable Channel," *Advertising Age*, pp. 21 (1997).
"Web Incentive Programs Wins Clout with Airline Alliance," *Advertising Age*, 68(39):43 (1997).
"Welcome to MyPoints: Get a $10 Gift Certificate," (2000) Retrieved from the Internet on Feb. 16, 2000: URL <http://www.mypoints.com/?MCK=3f47e40438ab16a4>.
"Welcome to Relevant Knowledge Article," (1997) Retrieved from the Internet on Nov. 6, 1997: URL <http://www.relevantknowledge.com>.
Baczynski, "What's the Point of Point Systems? Sales Personnel," *Potentials in Marketing*, 28(8):10 (1995).
Boyle, "The 100 Club," *Harvard Business Review*, pp. 26 (1987).
Casper, "Foodservice Almanac Software Directory: A Complete Listing of Packages for Every Phase of Your Operations; Directory," *ID: The Voice of Foodservice Distribution*, 30(6):59 (1994).
Cortese et al., "The Software Revolution," *Business Week*, pp. 78 (1995).
Desmond, "Can Japan Catch the Wave?; The One-Time Technology Leader is Struggling in the Race with the U.S. Down the Information Highway," *Time*, pp. 40 (1995).
Dowlling, "Sharper Image Hooks up with Sprint," *Catalog Age*, 12(9):8 (1995).
Dunkin et al., "Netting New Business on the Net," *Business Week*, pp. 84 (1995).
Green, "The New Ratings Game," *Business Week*, pp. 73-78 (1998).
Green, "Who Says the Young Have More Cyber Fun?" *Business Week*, pp. 92C (1998).
Hequet, "Non-Sales Incentive Programs Inspire Service Heroes; Includes Related Case Study; Reward & Recognition," *Training: The Magazine of Human Resources Development*, 27(8):53 (1990).
Highland, "The Cookie Monster," *EDPACS*, 24(6):16-18 (1996).
Jessell, "QVC Takes its Deals Online; Microsoft Network Services, Brief Article," *Broadcasting & Cable*, 125(50):94 (1995).
Magill, "Direct Tech Backs MyPoints' Online Targeting Program," *DM News*, 19(39):19 (1997).
McFadden, "Commerce on the Net.eclectronic Commerence; Internet Resource; Technology InformationColumn," *Digital Age*, 14(12):48 (1995).
McWilliams, "Small Fry Go Online," *Business Week*, pp. 158 (1995).
Millstein, "Electronic Marketing Set to Take Off in 1990s; Electronic Marketing Techniques in Supermarket; Management Information Systems, MIS Megatrends," *Supermarket News*, 39(41):33 (1989).
Morris, "For the Thrifty Business Traveler," *Nation's Business*, pp. 36 (1995).
MotivationNet, Inc., "Universal Rewards Currency Introduced at Internet World Show," *PR Newswire* (1997).
Muret, "Kiosks, On-Line Service Among Today's Ticket Agency Offerings," *Amusement Business*, 107(25):5 (1995).
Oberndorf, "Points for Loyalty," *Catalog Age*, 14(13):35 & 38 (1997).
Riedman, "MyPoints Aims to be Universal Web Currency," *Advertising Age*, 68:(17) (1997).
Schmeh, "Electronic Marketing: A Strategy for Survival: Forum," *Chain Store Age Executive with Shopping Center Age*, 68(6):50 (1992).
Shaffer, "Browser Boy vs. Bill Gates," *Forbes*, pp. 266 (1995).
Stevens, TCP/IP Illustrated, vol. 1, Addison Wesley Longman, Inc, pp. 231-234 (1994).
Stuart, "Employees Buy Awards with Rideshare Points," *Personnel Journal*, 72(1):65 (1993).
Thayer, "Database Marketing Demystified; Using Point of Sale Information to Find Out More About Customers; Including Related Articles," *Progressive Grocer*, 68(11):21 (1989).
Wagner, "Frequent-Surfer Programs Help Pull in the Hits," *ComputerWorld*, 31(40):45-46 (1997).
Webpage of Yahoo available at <http://www.web.archive.org/web/*/http://www.yahoo.com>, Feb. 14, 1998.
Welcome to Esearch The Source of Internet Market Research Article, first submitted Jul. 30, 1998.
Whitford, "Three Days in Cyberspace," *Inc.*, pp. 57 (1995).
International Search Report concerning International Application No. PCT/US99/10636, European Patent Office, dated Aug. 23, 1999, 7 pages.
International Search Report concerning International Application Serial No. PCT/US99/923041.0-2221, European Patent Office, dated Dec. 3, 2003, 8 pages.

* cited by examiner

SYSTEM AND METHOD FOR TRACKING USER ACTIVITY IN AN INCENTIVE AWARD SYSTEM

CROSS REFERENCE TO RELATED APPLICATIONS

This application is a continuation of U.S. application Ser. No. 11/770,994 filed Jun. 29, 2007, titled "Demographic Information Gathering and Incentive Award System and Method," which is a continuation of U.S. application Ser. No. 09/080,946 filed May 19, 1998, titled "Demographic Information Gathering and Incentive Award System and Method," the disclosure of which is incorporated herein by reference in its entirety for all purposes.

TECHNICAL FIELD

The present disclosure relates in general to efficiently detecting a visit to a web site participating in an incentive award program, wherein the visit is detected at an information gathering system and wherein the information gathering system provides the incentive award program.

BACKGROUND

Networked environments such as the Internet allow people using local network devices to request information from remote network devices. Typically the local network device is a personal computer (PC) executing client software (e.g., a web browser); the remote network device is a server executing server software; and the network is the Internet. The requested information could be a web page containing information related to a hyperlink. For example, a user (web site visitor) may request a web page about baseball, from a more general web page about sports, by selecting a picture of a baseball with a pointing device such as a mouse. Once the selection is made, the local device sends a message to the remote device via the network. The message typically includes the domain and the name (i.e., the address) of the requested information, as well as information uniquely identifying the local device. Often, several messages are exchanged between the client and the server, further specifying the identity and capabilities of the local device.

Frequently, the proprietor of a particular web site desires information about the people requesting information from his web site. This demographic information allows the proprietor to tailor the content of his web site to the preferences of its visitors. For example, if a particular page is visited frequently by a particular demographic group (e.g., teen males), then the web site proprietor could target that demographic group when selecting content such as advertising banners. Ordinarily, only limited demographic information such as browser version and the address of the local device are available for collection by the server. This limited demographic information is typically inadequate for most content tailoring, because it contains very little personal information about the visitor.

A common technique to overcome this drawback is to develop a profile for each visitor by requesting or requiring each visitor to fill out a questionnaire on their first visit. Profile information gathered from the questionnaire is then stored locally in a small file called a cookie on the visitors PC. Alternatively, the information is stored on the server and correlated to an identification number or password associated with the visitor. Regardless of the manner in which the profiles are stored, each time the visitor returns to the web site, his profile information is associated with the requests he makes, creating transaction information for subsequent analysis and content tailoring.

However, this technique suffers from certain drawbacks. Often, visitors are irritated by the inconvenience of multiple questionnaires from multiple web sites asking the same questions over and over. In fact, this may have the detrimental affect of averting visitors from such sites. Further, many visitors are unwilling to disclose personal information for fear it may compromise their privacy. Often, visitors prefer anonymous browsing in an effort to reduce junk e-mail. Although many web sites guarantee anonymity, others do not. Investigating individual proprietors privacy policies while browsing can be burdensome. Still further, collection of demographic information by individual proprietors precludes analysis by that proprietor that goes beyond his particular web site. For example, a web site proprietor may want to know what percentage of visitors to any web site (not just his own) are teen males.

SUMMARY

In accordance with a first aspect, a method of efficiently detecting a visit to a web site participating in an incentive award program, wherein the visit is detected at an information gathering system and wherein the information gathering system provides the incentive award program, the method including receiving a request message from a user including an award identifier, wherein the award identifier is associated with a predefined user activity and wherein the user sends the request message by activating a hyperlink presented on the participating web site during the visit; identifying a desired destination based on the request message received from the user, wherein the hyperlink advertises the desired destination to the user and wherein the desired destination is distinct from an address of the information gathering system at which the request message is received; and sending a redirect message to the user, wherein the redirect message includes an Internet address of the desired destination.

In some embodiments, an information gathering system offering incentive awards to registered users and adapted to efficiently detect a visit to a participating web site includes a profile server storing a plurality of user profiles; an address associated with the information gathering system; and a control circuit communicatively coupled to the profile server, including a receiving routine adapted to receive a message from a user, wherein the message is sent in response to the user activating a hyperlink presented by the participating web site, the message including an award identifier uniquely identifying an incentive award offered by the participating web site, wherein the hyperlink appears to the user as pointing to a desired destination distinct from the address of the information gathering system; and a redirection routine adapted to identify an address of the desired destination and send a redirect message to the user, the redirect message including the address of the desired destination.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on the Internet connecting personal computers to servers, persons of ordinary skill in the art will readily appreciate that the techniques of the present invention are in no way limited to the Internet, personal computers, or servers. On the contrary, any system which might benefit from tracking usage, relating that usage to user profiles, and/or from motivating users to use the system in predetermined ways may employ the techniques shown herein.

Figure 4:
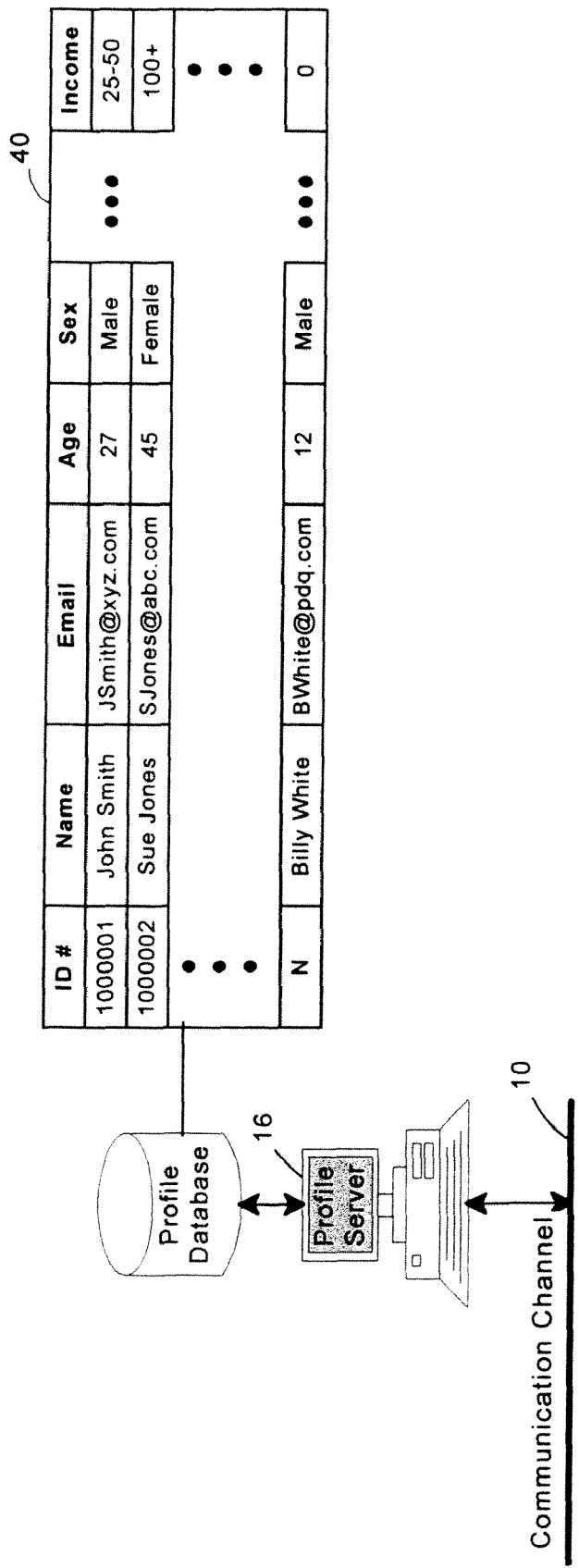
FIG. 4 is a block diagram showing a profile server, suitable for use as the profile server depicted in FIG. 1, along with a profile database.

Generally, a system employing the present invention provides web site proprietors with demographics information about the users who visit their web sites, and provides web site visitors with incentive awards (i.e. points) in exchange for providing the demographics information and visiting the web sites. Anyone who uses the Internet can be a participating web site visitor. To participate, a user must visit a registration web site and complete a questionnaire. The questionnaire is designed to solicit various demographics data of interest to web site proprietors. For example, a profile may include a participating user's age, income, occupation, etc. Once the questionnaire is completed, a profile server 16 sets up an account for the newly subscribing user and saves the user's demographic profile to a database 40 (see FIG. 4). Significantly, the user need only register once. Optionally, the participant may thereafter earn additional points by completing supplementary questionnaires. These new questionnaires expand the user's profile with new information or update the user's profile when information becomes outdated.

The profile information is then associated with identification information unique to the participant and stored in memory. The profiles (i.e., profile information with identification information) are preferably stored in a database 40 on a profile server 16 (see FIG. 4). However, each profile could be stored on the associated user's local device or in some other manner. In any event, the identification information is stored on the user's local device, typically as a cookie, to identify the user on subsequent visits to participating sites. Preferably, the identification information comprises a unique alphanumeric string (e.g., a serial number).

After registering, a user can enjoy the benefits of the system by visiting the web sites of one or more participating web site proprietors. Preferably, the web sites of participating proprietors will include a message identifying the site as one included in the program. For example, a logo indicating the number of points that may be earned could be displayed on an ad banner. The system automatically awards points to deserving users without requiring the users to manually leave the web site awarding the points. In this sense, the system is distributed. It works behind the scenes of numerous, typically unrelated web sites to monitor network usage and award points to visiting registered users.

Periodically, the system develops a report for each participating web site proprietor providing a demographics profile of the participating users that visited the site. The report is developed from the information gathered at the site in question and the system's database 40 of demographic profiles for participating users.

If they wish, each individual site proprietor can customize their site to request participating visitors to perform certain tasks such as answering questions or visiting certain pages. By performing the requested tasks, the participating user will be awarded points that can be redeemed for products or services at a later date. However, specific tasks need not be required in this manner. Instead, merely visiting a participating web site is preferably sufficient to obtain award points.

In addition to the registration site, the system provides redemption sites which participating users can visit to convert the points accumulated by visiting sites into products or services. The system automatically accepts redemption orders, places purchase orders with vendors for the requested product or service, and, where applicable, directs the vendor in question to deliver the redeemed products to the redeeming user. The points are automatically deducted from the participant's account, preferably located on a profile server 16.

A significant feature of the system is its ability to permit web site proprietors to create their own business rules governing the distribution of points. For example, a web site proprietor can select any number of points to be given visiting users; can specify activities or questions that must be completed by the visitor before points are awarded; and/or can limit the frequency at which users can be awarded points for visiting the site (e.g., once a year, once a month, etc.). As a further example, a web-site owner can provide two questionaires to visitors and award more points to visitors that answer the more extensive questionnaire than to visitors that choose to answer the more limited questionnaire. The points a web site awards are preferably purchased from a central provider at a premium over their redemption value. For example, an apparatus 8, as described below, could serve as such a central provider.

Figure 1:
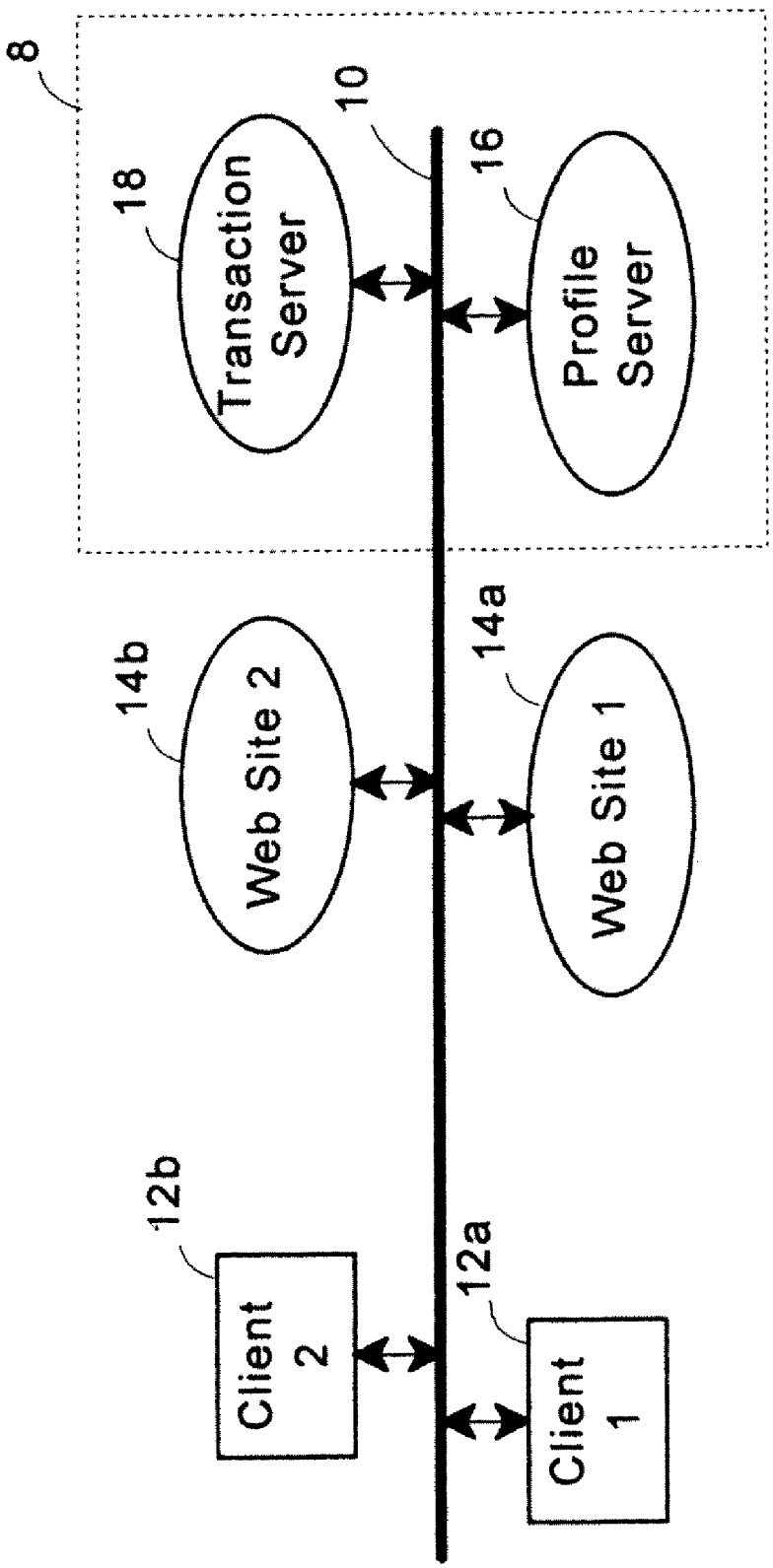
FIG. 1 is a block diagram of a computer network capable of utilizing the present invention.

Apparatus 8 constructed in accordance with the teachings of the invention is shown in FIG. 1 in a preferred embodiment. A communication channel 10 is shared by the apparatus 8, a plurality of clients 12, and web site servers 14. A client 12 is a consumer of information (e.g., a web site visitor) and a web site server 14 is a provider of information. Although a client could take on many forms, such as a telephone, pager, kiosk, teller machine, reservation system, etc., in the typical case for the Internet, the client 12 is implemented as a personal computer.

Figure 2:
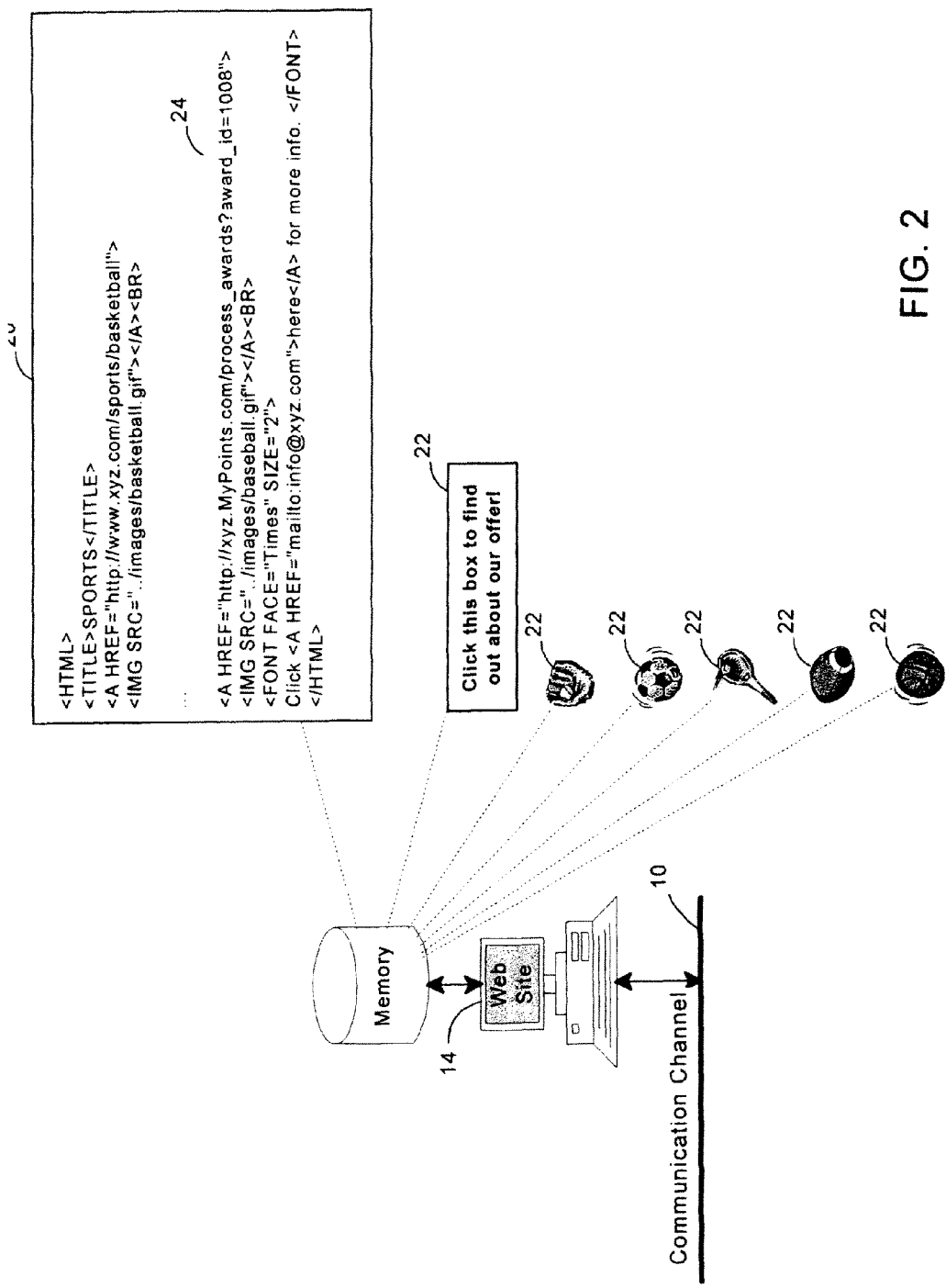
FIG. 2 is a block diagram showing a web site, suitable for use as the web site depicted in FIG. 1, along with the data files it serves.
Figure 3:
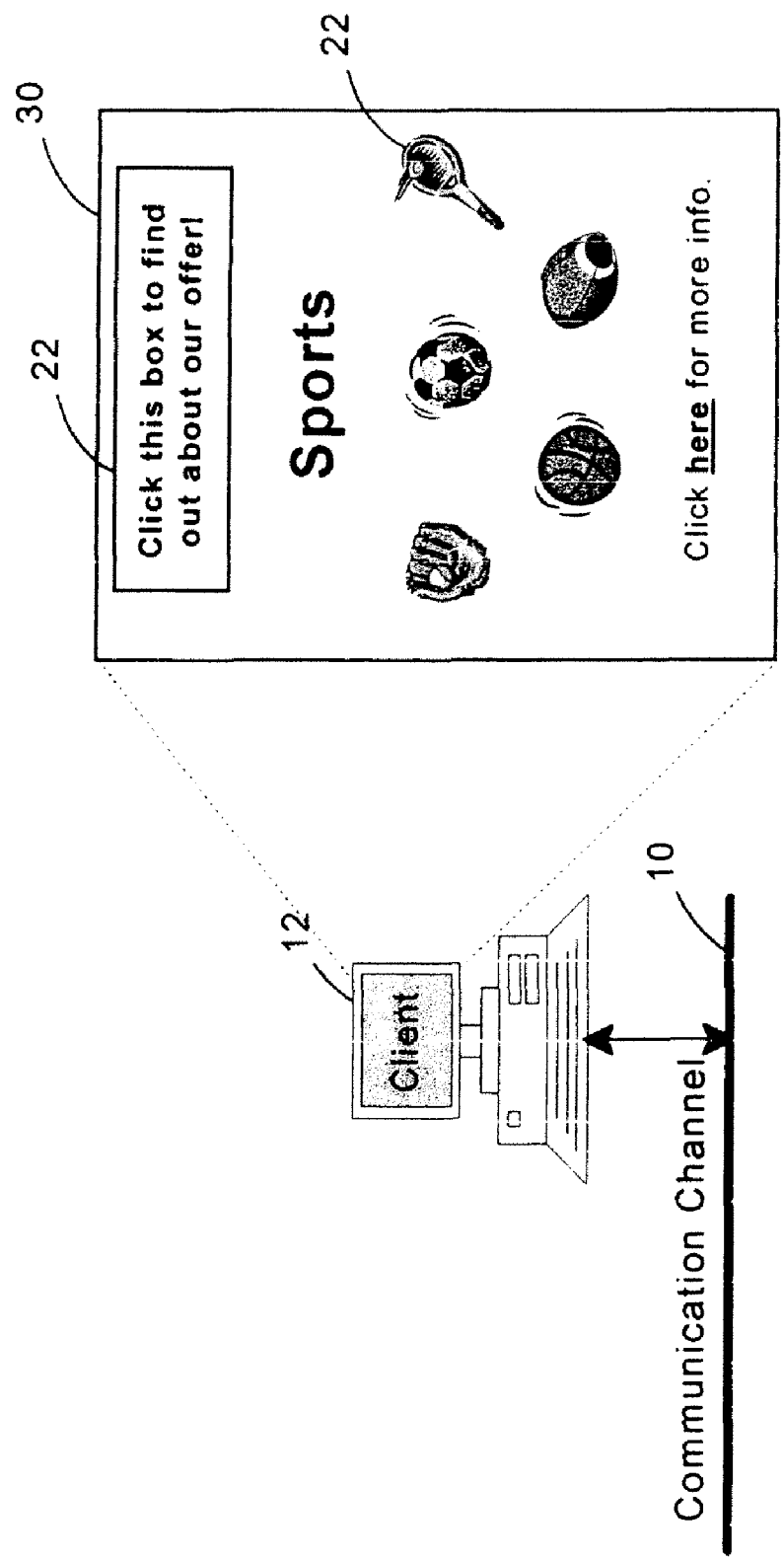
FIG. 3 is a block diagram showing a client, suitable for use as the client depicted in FIG. 1, along with a constructed web page.

Clients 12 request pages of information from the web sites 14 by transmitting a request message to an address where desired information is located. Typically this is accomplished by selecting a hyperlink that points to the desired page. Hyperlinks are usually pictures or highlighted words. A user may select the hyperlink in a variety of known ways. For example, the user could click on the hyperlink with a mouse or other pointing device. The user may or may not be a participating user (i.e. profile information may or may not be stored in the apparatus 8 for this user). The address specifies the name of the desired page and the domain in which it is located. For example, "www.xyz.com/sports" specifies the sports page in the www.xyz.com domain. In the typical instance, the web site 14 receives the request and responds with a markup file 20. The markup file 20 specifies the layout of the requested page and any content files 22 needed to construct the page (see FIG. 2). Subsequently, the client 12 receives the markup file 20 and makes further requests for the content files 22. As the files are received, the constructed page 30 is displayed on the client 12 (see FIG. 3).

Typically, hyperlinks point to a page associated with the link. For example, a picture of a baseball might lead to a web page about baseball. However, in the preferred embodiment, participating web sites may include hyperlinks that appear to point to an associated page, but actually point to a transaction server 18 resident in the apparatus 8 (see FIG. 1 and FIG. 5). Preferably, included in the hyperlink information is an award id 24. The combination of the award id 24 and the address of the hyperlink is unique within the domain of this web page. Further, all domain names are unique, therefore, the combination of domain name, address, and award id 24 is unique across the entire network and may be used to determine the ultimate destination of a hyperlink.

When a user selects a hyperlink that points to the transaction server 18, messages are transmitted to the transaction server 18. These messages may include the award id 24 associated with that hyperlink, user identification information, and the intended destination of the hyperlink. For the purpose of properly processing received messages, the apparatus 8 is provided with means for determining whether the user associated with a received message is a registered user. Preferably, the determining means makes this determination by retrieving the identification information stored on the user's local device (e.g., the cookie) and checking it against a local list of registered participants. Instead of a local list, the transaction server 18 could query the profile server 16 to access data stored on that server. Optionally, the transaction server 18 and the profile server 16 could be implemented as the same device. In an alternate embodiment, means associated with the participating web sites determine whether a web site visitor is one of the participating visitors. For example, software instructions operating in a microprocessor could query the registration server to determine if a web site visitor is a participating visitor. Alternatively, the participating web site could search a local list of participating visitors.

If the transaction server 18 determines that the user is not a participant, then it translates the award id 24 into an address that does point to an associated page (e.g., picture of baseball to a baseball page). This translation could be performed with a look-up table or by parsing the transmitted messages. Subsequently, the transaction server 18 preferably sends a message to the client 12 redirecting it to the associated page. The client 12 then requests the associated page from the appropriate web site 14. Alternatively, the non-participating user could be redirected to a registration page or temporarily shown a page about how points could have been earned if he were registered, and then subsequently redirected to the associated page.

Figure 5:
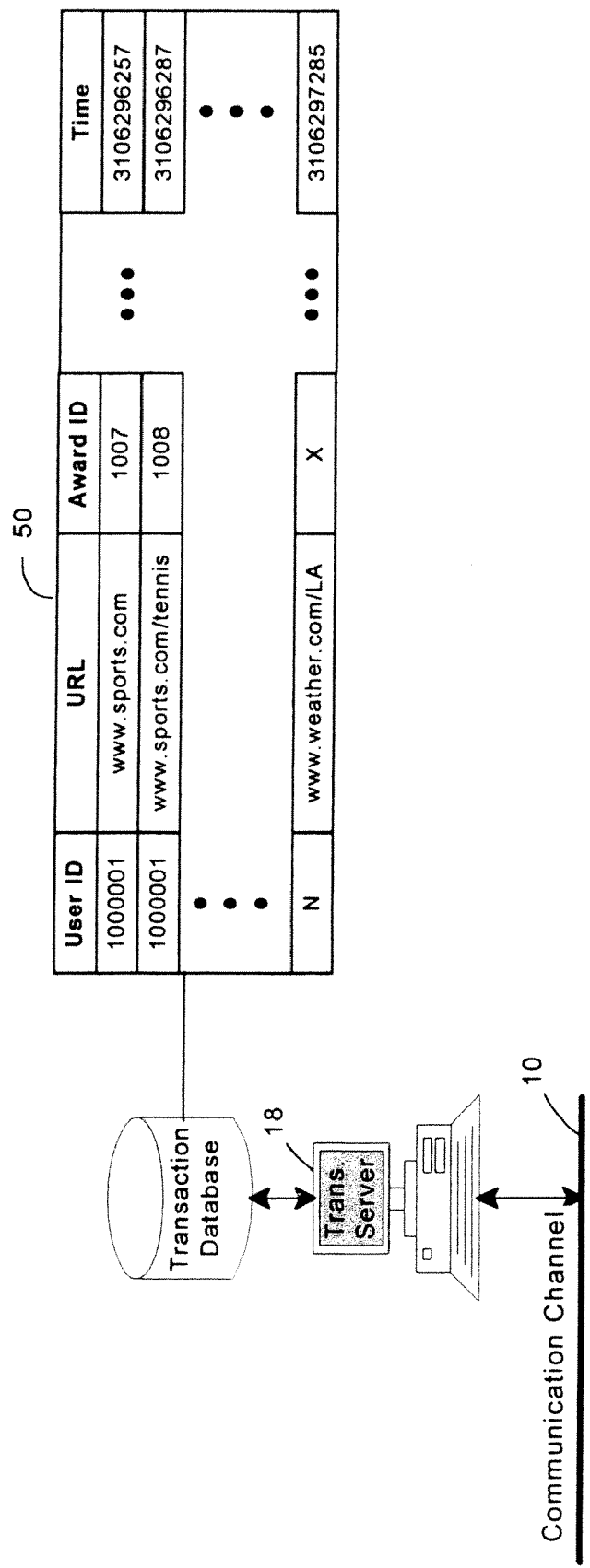
FIG. 5 is a block diagram showing a transaction server, suitable for use as the transaction server depicted in FIG. 1, along with a transaction database.

If the transaction server 18 determines that the user is a participant, it records data associated with the transaction in a transaction database 50 (see FIG. 5). For example, the transaction database 50 may include the participant's identification information, the award id, the address of the desired web page, and the time of the request. Alternatively, the data associated with the transaction could be stored by the profile server 16.

Optionally, the transaction server 18 includes means for awarding incentive points to participating web site visitors. Although a person with ordinary skill in the art will readily appreciate that the awarding means can be implemented in many ways with out departing from the scope of the invention, in the preferred embodiment the awarding means is implemented by software instructions operating in a microprocessor resident in apparatus 8.

Preferably, certain conditions must be met before points are awarded. These business rules are preferably unique to a participating web site and are preferably defined by that web site's proprietor. The business rules are preferably stored on the transaction server 18 and indexed by the award id. However, the business rules could optionally be stored on another server and retrieved. To determine if the participant identified by the identification information is eligible for the award identified by the award id, the awarding means tests the rules against circumstances specific to the participant. For example, the awarding means may award points because it determines that this visit is a first visit by this participant. Similarly, the awarding means may award points because it determines that a predetermined amount of time has elapsed since this participant's last visit. The size of the award (i.e. number of points awarded) could vary from visit to visit and is preferably determined by the web site(s). Further, the awarding means may refuse to award points because it determines that this visit is not the first visit by this participant. Similarly, the awarding means may refuse to award points because it determines that a predetermined amount of time has not elapsed since this participant's last visit. Optionally, the participant may earn points by completing certain tasks. For example, the participant may be asked to respond to a question or series of questions in exchange for a predetermined number of points.

Each web site could have a local business rule determining means or web sites could share one or more centralized determining means. For example, the determining means may be located proximate to a server associated with a web site. Alternatively, the determining means may be located proximate to the registration server. Further, the circumstances specific to each participant may be stored at the transaction server 18, on each participant's client, and/or on the profile server 16. In the event that information stored on a remote device is required to resolve a business rule, the determining means could query the appropriate device.

Preferably, if points are awarded the transaction is recorded, the participant's account is updated, and the award id 24 is translated into an address that points to an associated page. As in the non-participant case, the transaction server 18 preferably sends a message to the client 12 redirecting it to the associated page, and, the client 12 requests the associated page from the appropriate web site 14. Alternatively, the participating user could optionally be temporarily shown a page about how many points he earned, then redirected to the associated page; or, the participating user could optionally be redirected to a page based on his profile information. For example, a participant requesting information about local restaurants could be redirected to a page that is local to him based on his address. Periodically (e.g., once a day), the participant's account is updated using the transaction information.

The apparatus 8 is preferably provided with means for developing demographic information concerning visitors to web sites 14. This developing means can be implemented as means for associating the demographic information of a participating user with a visited web site 14. The developing means or the associating means may include software instructions operating in a microprocessor that correlate the web page visited and visitor identification information with information in the profile database. For example, the percentage of males visiting a particular web page or web pages could be calculated be looking up each participating visitor in the profile database, checking a field in the database for sex, and tabulating the results.

If, due to the controlling business rules of the visited site 14, no points are awarded, the transaction may be still recorded, but the participant's account is not updated. As before, the award id 24 is translated into an address that points to an associated page. Preferably, the transaction server 18 sends a message to the client 12 redirecting it to the associated page, and, the client 12 requests the associated page from the appropriate web site 14; or, the participating user could optionally be redirected to a page based on his profile information. Alternatively, the participating user could be temporarily shown a page informing him that no points were awarded, then redirected to the associated page.

Figure 6:
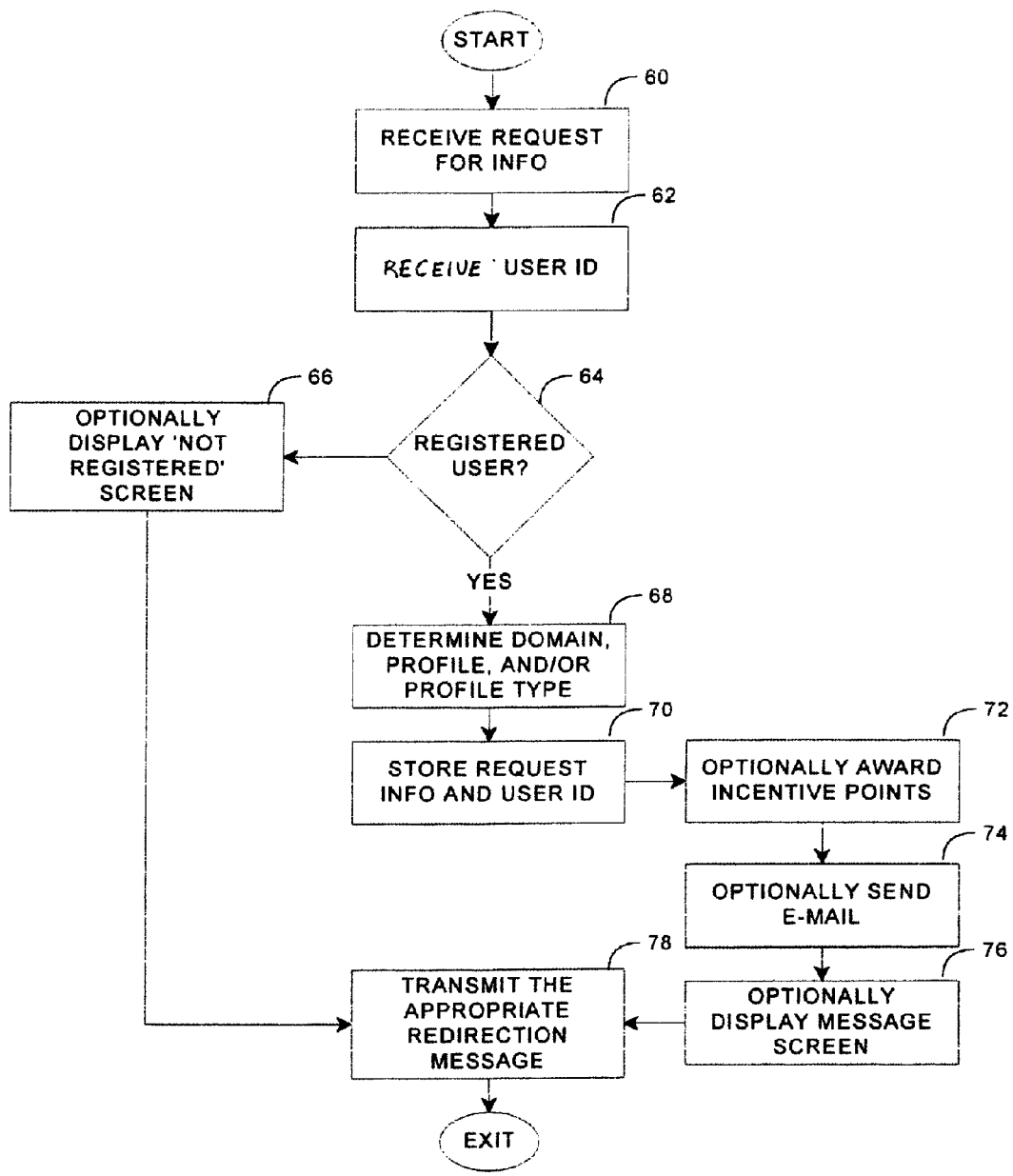
FIG. 6 is a flowchart of a program that can be implemented by the transaction server 18 to monitor network usage; and, FIG. 7 is a block diagram of an apparatus, suitable for use as the apparatus depicted in FIG. 1.

A flowchart of a program that can be implemented by the transaction server 18 to monitor network usage in accordance with the teachings of the present invention is illustrated in FIG. 6. The programmed steps are typically performed by a control circuit such as a microprocessor as is conventional. Once the program is initiated the control circuit waits until it receives a message, such as a request for information from a particular network address (block 60). Preferably the request is a transport protocol (HTTP) message such as a hypertext transport protocol message. Typically, the information (e.g., a particular web page) is related to a particular domain in the network (e.g., a particular web site).

Subsequently, the control circuit receives identification information from the client 12 making the request (block 62). The identification information may be any identifier such as a network address, an identification number, and/or a user name. Accordingly, the control circuit determines whether the user is a registered user (block 64) by waiting for valid identification information. If valid identification information is received, then the user is a registered user. Preferably, the identification information is an encrypted cookie. Alternatively, the identification information is checked against a predefined set of registered users. In the event that the control circuit determines that the client 12, browser, or the identification information is not associated with a registered user, it optionally transmits information to display a message informing the user about how points could have been earned if he were a registered participant (block 66). Subsequently, the control circuit transmits additional information to the client 12 from which the identification information originated (block 78). This additional information preferably includes a message redirecting a browser on the client 12 to request the desired information from the appropriate location; or, the participating user could optionally be redirected to a page based on his profile information.

In the event that the control circuit determines that the identification information is associated with a registered user (block 64), it may determine what domain the requested information is related to (block 68). Typically, the domain name is included in the hyperlink and in the message requesting the information. For example, a request for a desired web page includes the address of the web page, which includes the domain. Alternatively, the domain name may be in the lookup table used to translate an award if into an intended destination.

Further, the control circuit may determine whether the user is associated with a predefined profile type. For example, the control circuit may be programmed to determine if the user is male. This determination can then be used in a variety of ways. For example, it could be stored in the transaction database 50, included in a report, used to determine the number of incentive points to award, or used to determine what messages to transmit. To determine if a user matches a predetermined profile type the control circuit could query the profile database 40 using the received identification information and compare the results of the query with the predetermined profile type. Alternatively, any other database containing the appropriate information could be used (e.g., a subset of the profile database located on the transaction server 18).

Subsequently, the control circuit associates the request for information with the identification information and preferably stores the associated data in a database 50 on the transaction server 18 at a block 70 (see FIG. 5). However, the database may be stored on the profile server 16, on a client 12, on several clients 12, or on some other device. Further, the database could be queried over the communication channel 10 or over some other communication means such as a dedicated connection. Optionally, the control circuit awards or adjusts incentive points (block 72). The number of incentive points awarded is preferably based on business rules established by the web site proprietor. The business rules are preferably stored on the transaction server 18. However, the business rules may be stored on the profile server 16, on a client 12, on several clients 12, or on some other device. The business rules compare the current transaction to relevant parameters such as time since last visit and profile information to determine the number of points to be awarded.

Further, the control circuit may transmit other messages, such as an e-mail message (block 74). The e-mail message could be composed based on the predefined profile associated with the user. For example, if a registered user requests information related to a new car purchase, a dealer in the user's area could be determined by the user's location information, and a personalized invitation for a test drive could be sent to the user on behalf of the dealer if the user is over a certain age and income level. Still further, the control circuit may transmit other messages, such as information to display a message informing the user about how many points were awarded or that no points were awarded and why no points were awarded (block 76). For example, on a first visit a participating user may be informed that he earned 500 points, but on a subsequent visit on the same day the participating user may be informed that no points were awarded and that he should return in 24 hours.

In response to receiving the request for information, the control circuit transmits a representation of the requested information (block 78). For example, the representation may be a web page, or the network address of a web page instructing the client 12 to request the information from a particular web site 14 (e.g., a redirection message). As a result the desired information is typically displayed on the client 12.

Figure 7:
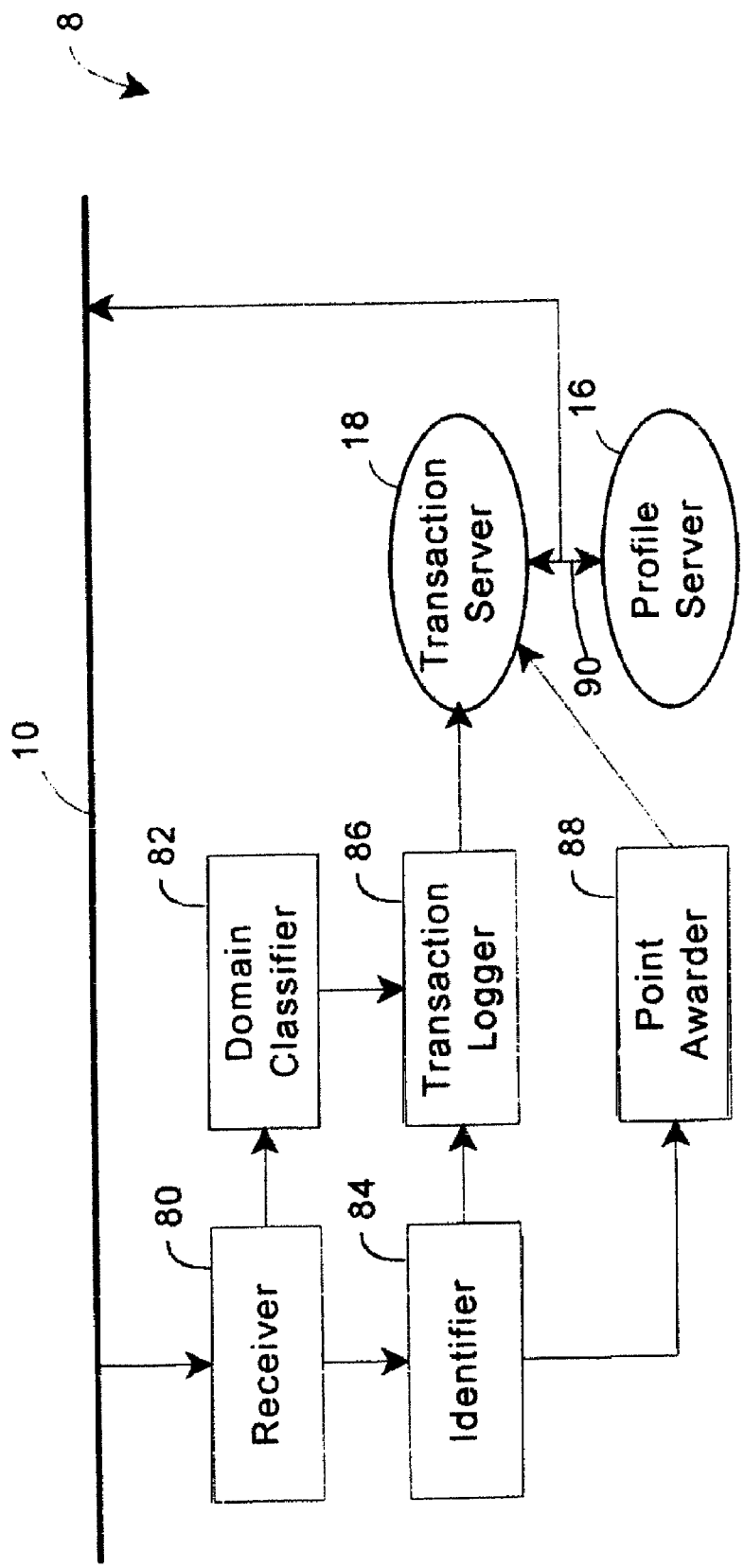

A block diagram of a device suitable for use as the apparatus 8 is illustrated in FIG. 7. The device comprises a set of coupled circuits, such as software instructions operating in a microprocessor. Messages requesting information arrive over the communication channel 10. Means for receiving, such as a receiver circuit 80, capture the message for processing in a known manner. The domain of origin and/or the domain of the desired information is determined by means for determining, such as a domain classifier circuit 82. Preferably, the domain classifier 82 parses the message to determine the domain of origin and/or the domain of the desired information. Similarly, means for determining whether the user is identified in a database, such as an identifier circuit 84, examines the message for identification information. Preferably, the identification information is a cookie retrieved from the client 12. Portions of the message, including the domain and identification information are preferably stored by means for modifying. For example, a transaction logger 86 may send instructions to the transaction server 18 for such purposes. Similarly, means for storing and adjusting incentive points, such as a point awarder circuit 88, modify point information on the profile server 16. Means for transferring information between the transaction server 18 and the profile server 16 allow information destined for one to be stored on the other and then updated. For example, the transaction information is preferably transferred to the profile server periodically. Means for transferring preferably include a transceiver on each of the devices and a network connection.

In summary, persons of ordinary skill in the art will readily appreciate that a demographic information gathering system and method have been provided. Users of systems implementing the teachings of the present invention can enjoy network browsing with increased privacy, unfettered by redundant questionnaires. Further, these users may be rewarded for their activity. Proprietors of such systems can benefit from the collection of demographic information across domains as well as increased traffic.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of efficiently detecting a visit to a web site participating in an incentive award program, wherein the visit is detected at an information gathering system and wherein the information gathering system provides the incentive award program, the method comprising:
   receiving, at the information gathering system operating on the Internet, a request message from a user including an award identifier, wherein:
      the information request message conforms to an Internet protocol,
      the award identifier is associated with a predefined user activity and a certain amount of incentive award points for future redemption by the user,
      the user sends the request message by activating a hyperlink presented on the participating web site during the visit, and
      the participating web site is operated independently of the information gathering system;
   automatically identifying a desired destination based on the request message received from the user, wherein the hyperlink advertises the desired destination to the user and wherein the desired destination is distinct from an address of the information gathering system at which the request message is received and from the participating web site; and
   sending a redirect message to the user, wherein the redirect message directs the user to an Internet address of the desired destination, and wherein the redirect message conforms to an Internet protocol.

2. The method of claim 1, wherein receiving a request message from a user further includes receiving a hypertext transport protocol (HTTP) request and receiving an Internet domain associated with the desired destination; and wherein the hyperlink is one of a highlighted text or a banner including at least one image.

3. The method of claim 2, further comprising generating the hyperlink so that the hyperlink communicates to the user a size of an award corresponding to the award identifier.

4. The method of claim 1, wherein sending a redirect message to the user includes:
   sending a first redirect message in response to detecting that the user is registered with the information gathering system, wherein the information gathering system maintains a profile for each registered user; and
   sending a second redirect message in response to detecting that the user is not registered with the information gathering system, wherein the first redirect message and the second redirect message direct the user to different respective destinations on the Internet.

5. The method of claim 4, wherein sending a first redirect message includes receiving a valid user identifier in the request message, wherein the valid user identifier uniquely identifies the user within the information gathering system.

6. The method of claim 4, wherein sending a first redirect message includes customizing the first redirect message according to the profile of the registered user, wherein the profile includes demographic information.

7. The method of claim 1, further comprising:
   presenting an interstitial confirmation web page to the user in response to detecting that the user is registered with the information gathering system, including providing information related to an actual award earned by the user at the first interstitial page; and
   presenting an interstitial incentive web page to the user in response to detecting that the user is not registered with the information gathering system, including presenting information related to a potential award which the user could have earned if the user had registered with the information gathering system.

8. The method of claim 1, wherein identifying a desired destination based on the request message includes looking up the desired destination in a table indexed by the award identifier.

9. The method of claim 1, wherein receiving a request message from a user further includes receiving the desired destination embedded in the request message.

10. An information gathering system offering incentive awards to registered users and adapted to efficiently detect a visit to a participating web site, the system comprising:
   a profile server storing a plurality of user profiles;
   an address associated with the information gathering system; and
   a transaction server communicatively coupled to the profile server, including
      a receiving routine including software instructions executable by a processor and adapted to receive a message from a user, wherein the message is sent in response to the user activating a hyperlink presented by the participating web site operated independently of the information gathering system, the message including an award identifier uniquely identifying an incentive award offered by the participating web site and associated with a certain amount of incentive award points for future redemption by the user, wherein the hyperlink appears to the user as pointing to a desired destination distinct from the address of the information gathering system; and
      a redirection routine including software instructions executable by a processor and adapted to identify an address of the desired destination and send a redirect message to the user, the redirect message including the address of the desired destination distinct from the participating web site.

11. The system of claim 10, further comprising a look up table, wherein the look up table translates the awarding identifier into the address of the desired destination.

12. The system of claim 10, wherein the hyperlink includes an indication of a size of the incentive award.

13. The system of claim 10, wherein the message conditionally includes a user identifier, wherein the user identifier uniquely identifies a profile of the user in the profile server, wherein the user is included only if the user is registered with the information gathering system.

14. The system of claim 13, wherein the redirection routine is further adapted to adjust the redirect message according to the user profile if the message includes a valid user identifier.

15. The system of claim 13, wherein the redirection routine is further adapted to direct the user to a local business based on an address of the user stored in the user profile if the message includes a valid user identifier.

16. The system of claim 13, wherein the redirection routine is further adapted to display a confirmation page to the user prior to sending the redirect message, wherein the confirmation page confirms awarding of the incentive award to the user.

17. The system of claim 10, wherein the redirection routine is adapted to display an incentive page to the user prior to sending the redirect message if the message does not include a valid user identifier, wherein the incentive page includes an invitation to register with the information gathering system.

18. The system of claim 17, wherein the incentive page further specifies a size of the award which the user could have received if the user had previously registered with the information gathering system.

19. The system of claim 10, wherein the message further includes a destination domain identifier associated with the address of the desired destination, and wherein the system further comprises a look up table, wherein the look up table is configured to translate the awarding identifier and the destination domain identifier into the address of the desired destination.

20. The system of claim 19, wherein the destination domain identifier is included as a hostname in a system domain identifier, wherein the system domain identifier is associated with the address of the information gathering system.

* * * * *